Figure 1:
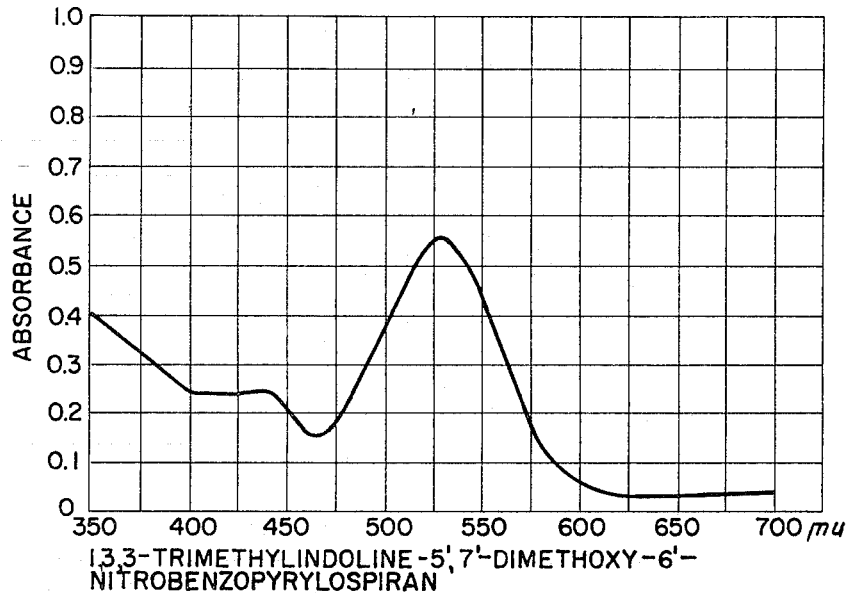

1,3,3-TRIMETHYLINDOLINE-5',7'-DIMETHOXY-6'-NITROBENZOPYRYLOSPIRAN 1,3,3-TRIMETHYLINDOLINE-7'-METHOXY-6'-NITROBENZOPYRYLOSPIRAN

INVENTORS
JOHN E. G. TAYLOR
DAVID B. McQUAIN
RICHARD E. FOX
RICHARD E. BOWMAN
& FRANCIS D. THOMSON

BY *Louis A. Kline*
*Armand G. Morin Sr.*

THEIR ATTORNEYS 3,290,331
6'NO₂,7'-METHOXY INDOLINO-
BENZOSPIROPYRANS

John E. G. Taylor, David B. McQuain, Richard E. Fox, Richard E. Bowman, and Francis D. Thomson, all of Dayton, Ohio, assignors to The National Cash Register Company, Dayton, Ohio, a corporation of Maryland
Filed Mar. 30, 1964, Ser. No. 355,697
1 Claim. (Cl. 260—326.11)

This invention relates to photochromic compounds, and, particularly, to 7'-methoxy substituted indolino benzospiropyrans which are useful in the field of eye protective filters.

It is known to use photochromic spiropyran compounds as active electromagnetic radiation absorbing materials for eye protective purposes, as shown, for example, in the application of Elliot Berman et al. for United States Letters Patent, Serial No. 173,355, filed February 15, 1962, now U.S. Patent No. 3,149,120, wherein a large number of benzoxazole and benzothiazole spiropyrans are disclosed as useful for making optical filters which darken when subjected to ultra-violet or blue light and, thus, to a greater or lesser degree, depending on the characteristics of the particular photochromic compound, prevent transmission through said filters of light in the visible region of the spectrum. It is disclosed in the above-mentioned United States patent application that certain spiropyrans are reversibly colorable and stable in the colored form, while in solution, only at low temperatures, such as —60 degrees centigrade, if unexposed to light having a wavelength longer than blue light. It is also disclosed therein that other classes of spiropyrans are reversibly colorable at moderate temperatures (—20 degrees centigrade to +30 degrees centigrade) and additionally, when in the colored state, are characterized by a wide range of thermal stability at such temperatures. For example, the thermal stability of some classes of spiropyrans may be as short as a fraction of a second, whereas other classes are very stable and have a half-life of several weeks. Typical of the latter are compounds disclosed in United States Patent No. 3,100,778, issued to Elliot Berman on August 13, 1963.

The thermal stability of a compound is normally expressed as the half-life of the colored form of the compound, the half-life being a measure of the rate at which the compound reverts from the colored state to the colorless state when in solution at a stated temperature. Under standard conditions, the rate of reversion from the colored state to the colorless state is temperature-dependent and normally increases with increasing temperature.

Eye protective filters which include photochromic chemical compounds as a reversible light-absorbing medium are designed to (1) transmit a large proportion of ambient visible light when the need to protect the wearer's eyes is minimal, (2) have the capability of changing from a state of high transmittance to a state of high optical density within a few microseconds, (3) be capable of self-clearing from a state of high optical density to a state of high transmittance within a matter of seconds, preferably through the use of short thermal half-life spiropyrans, and (4) be so constituted that they permit repeated cycling from a state of high transmittance to a state of low transmittance without undue deterioration of the absorbing material. Many of the spiropyran compounds known in the prior art possess at least one of the above, as well as other desirable filter characteristics; however, none of such known compounds possess the optimum combination of such essential characteristics to a sufficient degree to constitute the ultimate photochromic compound for eye protective filter applications. For example, a given spiropyran having a nearly ideal open-state transmission may have a thermal half-life which is too long for eye filter applications, whereas another spiropyran will be characterized with an ideal thermal half-life but be lacking in one or more of the characteristics determined as necessary for filter applications. Hence, the selection of a spiropyran having certain inherent filter characteristics is determined by the desired end use of the filter, which, in turn, dictates which characteristic or combination of characteristics will best perform the desired function.

The novel compounds of the present invention combine, among others, two highly desirable properties which are not found in the prior-art spiropyran compounds. The first and most important is that the compounds exhibit a strong absorption between 450 millimicrons and 550 millimicrons; the second, that the compounds have a very short yet practical thermal half-life at moderate temperatures. The bulk of the previously-known spiropyrans display their strongest absorption at around 600 millimicrons and above, so that spiropyrans which include strong absorption around 550 millimicrons as one of their desirable eye filter characteristics have been sought after for some time. The absorption of light in the region around 550 millimicrons is of distinct importance primarily because of the human eye has its maximum sensitivity to visible light within this narrow region.

Figure 2:
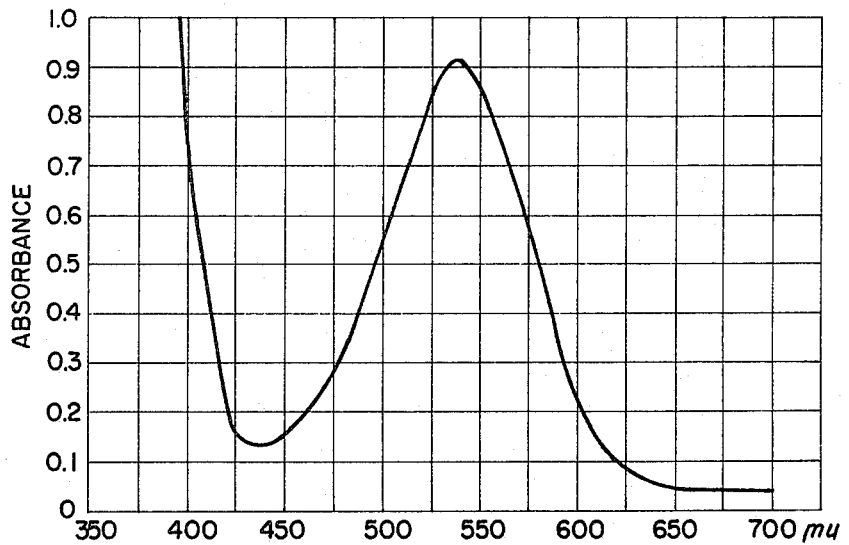

FIGURES 1 and 2 illustrate the strong absorption between 450 millimicrons and 550 millimicrons which is characteristic of the compounds of the invention as used in a typical eye filter application. These absorption spectra were obtained with compounds of the invention dissolved in anacryloid-toluene composition, the latter being frequently employed in the fabrication of eye protective filters.

*Example 1*

The preferred compound of the invention is 1,3,3-trimethylindoline-5',7' - dimethoxy - 6' - nitrobenzopyrylospiran, having the following structural formula:

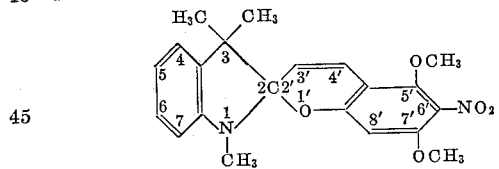

The compound of the above formula is conveniently made by the following procedure:

A solution of 60 grams (0.39 mole) of 4,6-dihydroxysalicylaldehyde (purchased from Eastman Kodak Company), 80 grams of sodium carbonate, 126 grams (1 mole) of dimethyl sulfate, and 600 milliliters of acetone is refluxed for two hours. The acetone is evaporated off on a hot plate, and the residue is steam-distilled to yield 14 grams of 4,6-dimethoxysalicylaldehyde having a melting point of 66 degrees centigrade to 70 degees centigrade.

To make the nitrated intermediate 4,6-dimethoxy-5-nitrosalicylaldehyde, 14 grams of 4,6-dimethoxysalicylaldehyde dissolved in 300 milliliters of glacial acetic acid is nitrated by adding 20 grams of nitric acid (density 1.6) and holding the temperature of the solution below 38 degrees centigrade. The precipitate which separates from the solution is recrystallized from ethanol and yields the nitrated intermediate with a melting point of 192 degrees centigrade to 193 degrees centigrade.

In the final preparative step, a solution containing 0.9 gram of 4,6-dimethoxy-5-nitrosalicylaldehyde, 0.8 gram of 1,3,3-trimethyl-2-methylene-indoline, and 100 milliliters of ethanol is refluxed for two hours. The precipitate which settles out is recrystallized from benzene-pentane to yield yellow crystals of the compound having the above formula.

Analysis of $C_{21}H_{22}N_2O_5$. Calculated: C, 65.95; H, 5.8; N, 7.32. Found: C, 65.80; H, 5.6; N, 7.20.

The spectral absorption of this compound is illustrated in FIGURE 1. At 25 degrees centigrade, in a toluene-acryloid film, it has a half-life of 5.1 seconds.

Example 2

Another 7'-methoxy spiropyran possessing the unique properties discussed previously is 1,3,3-trimethylindoline-7'-methoxy-6'-nitrobenzopyrylospiran, having the following structural formula:

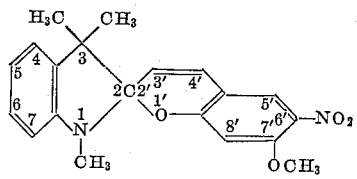

A practical and efficient process for preparing this compound is as follows:

In a 500-milliliter flask place 50 grams of 4-hydroxysalicylaldehyde, 33 grams of dimethyl sulfate, and 200 milliliters of 10% aqueous sodium hydroxide solution, and shake vigorously for fifteen minutes. The mixture is then acidified with hydrochloric acid and steam-distilled to yield 25 grams of 4-methoxysalicylaldehyde as a white solid having a melting point of 40 degrees centigrade to 42 degrees centigrade. This intermediate is then nitrated by adding 7 grams of fuming nitric acid (density 1.52) to a cold solution of 8 grams of the 4-methoxysalicylaldehyde in 100 milliliters of glacial acetic acid. A yellow precipitate is formed, filtered off, and washed with water. The washed precipitate is then recrystallized from ethanol to yield 3 grams of 5-nitro-4-methoxysalicylaldehyde, having a melting point of 168 degrees centigrade to 169 degrees centigrade. In the final step, 2.5 grams of the 5-nitro-4-methoxysalicylaldehyde and 2.2 grams of Fischer's base, 1,3,3-trimethyl-2-methyleneindoline, is dissolved in 50 milliliters of 95% aqueous ethanol and then refluxed for two hours, cooled, and filtered. This precipitate is recrystallized from ethanol to give 3 grams of the desired compound, having a melting point of 180 degrees centigrade to 181 degrees centigrade.

Analysis of $C_{20}H_{20}N_2O_4$. Calculated: C, 68.16; H, 5.72; N, 7.95. Found: C, 68.1; H, 5.7; N, 8.0.

The compound of this example has a thermal half-life in acryloid-toluene solution at 25 degrees centigrade of 3.9 seconds and the spectral absorption shown in FIGURE 2.

What is claimed is:

The compound 1,3,3-trimethylindoline-5',7'-dimethoxy-6'-nitrobenzopyrylospiran.

References Cited by the Examiner

UNITED STATES PATENTS 2,953,454   9/1960   Berman _____ 260—319 X
3,100,778   8/1963   Berman _____ 260—319

OTHER REFERENCES

Berman et al.: Jour. Amer. Chem. Soc., volume 81, 1959, pp. 5605–5608.

ALEX MAZEL, *Primary Examiner.*

HENRY R. JILES, *Examiner.*

M. O'BRIEN, *Assistant Examiner.*